US006971707B1

(12) United States Patent
Mullan

(10) Patent No.: US 6,971,707 B1

(45) Date of Patent: Dec. 6, 2005

(54) EXTENDABLE TRAILER PATIO ROOM

(75) Inventor: Terry Mullan, London (CA)

(73) Assignee: Glendale Recreational Vehicles Inc., Strathroy (CA)

( * ) Notice: Subject to any disclaimer, the term of this patent is extended or adjusted under 35 U.S.C. 154(b) by 0 days.

(21) Appl. No.: 10/934,429

(22) Filed: Sep. 7, 2004

(30) Foreign Application Priority Data

Sep. 3, 2004 (CA) .................................... 2480424

(51) Int. Cl.[7] .................................................. B60P 3/39

(52) U.S. Cl. .................... 296/172; 296/159; 296/26.08

(58) Field of Search ................................ 296/159, 161, 296/162, 163, 165, 172, 176, 26.08, 26.1

(56) References Cited

U.S. PATENT DOCUMENTS 2,353,820 A * 7/1944 Eddins .................... 296/26.11
3,811,723 A * 5/1974 Anderson ................ 296/26.11
4,065,166 A * 12/1977 Shoemaker ................. 296/159
4,222,604 A * 9/1980 Human ....................... 296/165
4,544,195 A * 10/1985 Gunn ...................... 296/26.11
5,358,298 A * 10/1994 Fate ........................ 296/26.11
5,417,468 A * 5/1995 Baumgartner et al. ...... 296/162
5,899,518 A * 5/1999 Schreiner ................. 296/26.01
6,293,611 B1 * 9/2001 Schneider et al. .......... 296/165
6,502,893 B1 * 1/2003 Corliss, Jr. .................. 296/162

FOREIGN PATENT DOCUMENTS

GB 2164005 A * 9/1984

* cited by examiner

*Primary Examiner*—Jason Morrow
(74) *Attorney, Agent, or Firm*—Dimock Stratton LLP; Mark B. Eisen

(57) ABSTRACT

An extensible, exterior room for a recreational vehicle trailer comprising a floor, a roof, and at least one flexible wall is provided. The floor and the roof are each extensible between a stowed position and an open position. The floor is supported at one end by a frame on the underside of the trailer chassis, and at the other end by stabilizer legs with optional wheel mounts that are rotatable between a working and a non-working position. The roof is hinged to the trailer and is supported in the open position by hydraulic struts. The flexible walls are detachable from the roof and floor and may be stowed separately. The exterior room is accessible from the interior of the trailer through an exit, such as a sliding door style patio door.

4 Claims, 3 Drawing Sheets

64
60
66
80
10
68
20
82
90
84
72
48
55
58
40
44
42

EXTENDABLE TRAILER PATIO ROOM

FIELD OF THE INVENTION

This invention relates to an improvement in recreational vehicle trailers.

BACKGROUND OF THE INVENTION

Recreational vehicles, such as campers and fifth wheel trailers, are designed and equipped to provide efficient use of space within vehicle. For example, a fifth wheel trailer may be fitted with a slide-out whereby additional floor space can be created when the fifth wheel trailer is in the parked position. Slide-outs commonly extend out of one side of the trailer, thereby increasing the interior room width. A fifth wheel trailer may also be provided with a front section that extends over the cab of the supporting truck, when the trailer is coupled to the truck via the fifth wheel hitch, as taught in U.S. Pat. No. 6,394,533 issued to Ladell et al. By providing a front section that extends both over the towing bed and over the truck cab, additional living space is provided without enlarging the footprint of the trailer.

Furthermore, it is desirable to provide exterior living space supported by the recreational vehicle. Currently, this is accomplished by providing a retractable canopy or awning fixed to the exterior of the vehicle. While this provides shading over an area adjacent to the vehicle, the bare surface of the shaded ground adjacent the vehicle, which may not be even or level, is not always suitable for recreational use. Thus, to further extend the living space available around a recreational trailer, a user may construct a wooden or concrete platform, deck or patio adjacent the trailer (and beneath the extended canopy, if available) in order to provide a useable floor. The deck or patio may be installed at approximately ground level, or may be elevated to be substantially level with the interior trailer floor. However, given the expense and materials required to construct a suitable deck or patio for a recreational trailer, this solution is feasible only if the trailer is intended to be parked in a single location for an extended period of time.

Thus, it is desirable to provide means for providing additional usable recreational space around a recreational trailer, without adding to the overall length or width of the recreational vehicle, and without necessitating the installation of a permanent or semi-permanent platform or deck.

SUMMARY OF THE INVENTION

Accordingly, an aspect of the present invention provides an improvement to a recreational vehicle trailer comprising and extendible exterior room, having a floor extensible between a stowed position and an open position and a roof extensible between a stowed position and an open position, wherein when the floor is in its extended position and the roof is in its open position, the space defined by the floor and the roof is accessible through an exit from the interior of the trailer. A further aspect of the invention provides at least one flexible wall extending between the floor and the roof when the floor and roof are both in their open position, thus defining an exterior room that is accessible through an exit from the interior of the trailer.

The invention further provides an exterior floor for a trailer that is supported above ground level by the trailer, and by at least one stabilizer leg movable between at least one working position and a non-working position. In further aspect, the trailer supports the floor via a channel disposed on an underside of the trailer, wherein an edge of the floor is carried within the channel.

Another aspect of the invention is the provision of a stabilizer leg for supporting the floor having a leg portion movable between a raised and at least one lowered position, and a wheel mounted on a bracket, the bracket being movable between a working position and a non-working position, wherein in the working position, the wheel is substantially perpendicular to ground level, and in the non-working position, the wheel is substantially parallel to ground level, such that when the stabilizer leg is in the non-working position, the bracket is in the non-working position and the leg portion is in the raised position, such that the wheel is not in contact with ground level; and when the stabilizer leg is in a first working position, the bracket is in the working position and the leg portion is in a lowered position, such that the wheel is in contact with ground level. Still a further aspect of the invention is a stabilizer leg with a second working position, in which the bracket is in the non-working position and the leg portion in is a lowered position, such that the stabilizer leg supports the floor above ground level.

Another aspect of the invention is the provision of an exterior room for a recreational vehicle trailer with a roof that is supported in the open position by at least one support post disposed between the roof and the floor of the room.

The invention further provides a method for erecting an exterior room for a recreational vehicle trailer, comprising the steps of: providing a floor that is extensible between a stowed position and an open position, a roof that is extensible between a stowed position and an open position, and at least one flexible wall, wherein the floor is supported in the open position above ground level by the trailer and by at least one stabilizer leg movable between a working position and a non-working position, and the roof is movable towards the open position by at least one hydraulic strut; moving the roof from the stowed position towards the open position by extending the at least one hydraulic strut; moving the at least one stabilizer leg from the non-working to the working position, and pulling the floor to the open position; and attaching the at least one flexible wall to the roof and to the floor.

The invention further provides a method for erecting an exterior room, further comprising the step of supporting the roof in the open position by providing at least one support post between the roof and the floor.

BRIEF DESCRIPTION OF THE DRAWINGS

In drawings which illustrate by way of example only a preferred embodiment of the invention.

DETAILED DESCRIPTION OF THE INVENTION

Figure 1:
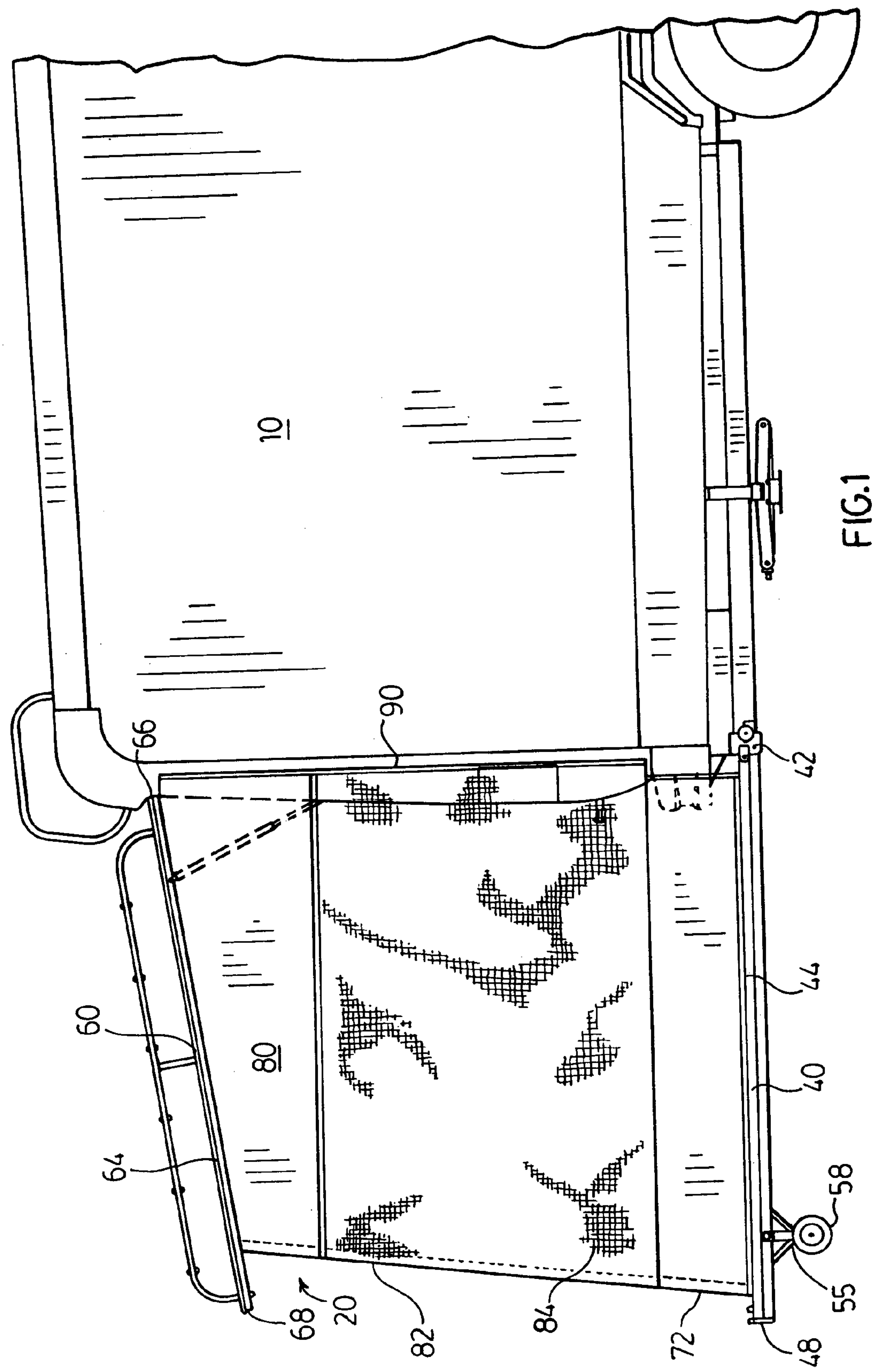
FIG. 1 is a side elevation of a trailer with an extendable patio room and screens according to an embodiment of the present invention.

Referring to FIG. 1, the rear portion of a fifth wheel trailer 10 is shown with the patio room 20 extended from the trailer 10, preferably from the rear of the trailer 10. The patio room 20 generally comprises an extendable patio floor 40 and a retractable roof 60. Preferably, screens 80, 82 (not visible in FIG. 1), and 84 are provided and depend downwardly from the roof 60 to provide additional protection to occupants against the weather or pests such as insects. In the extended position, the floor 40 is supported by a pair of stabilizer legs 55. Preferably, as described below, the stabilizer legs 55 are also provided with wheels 58 to assist during the extension of the patio floor 40.

Figure 2:
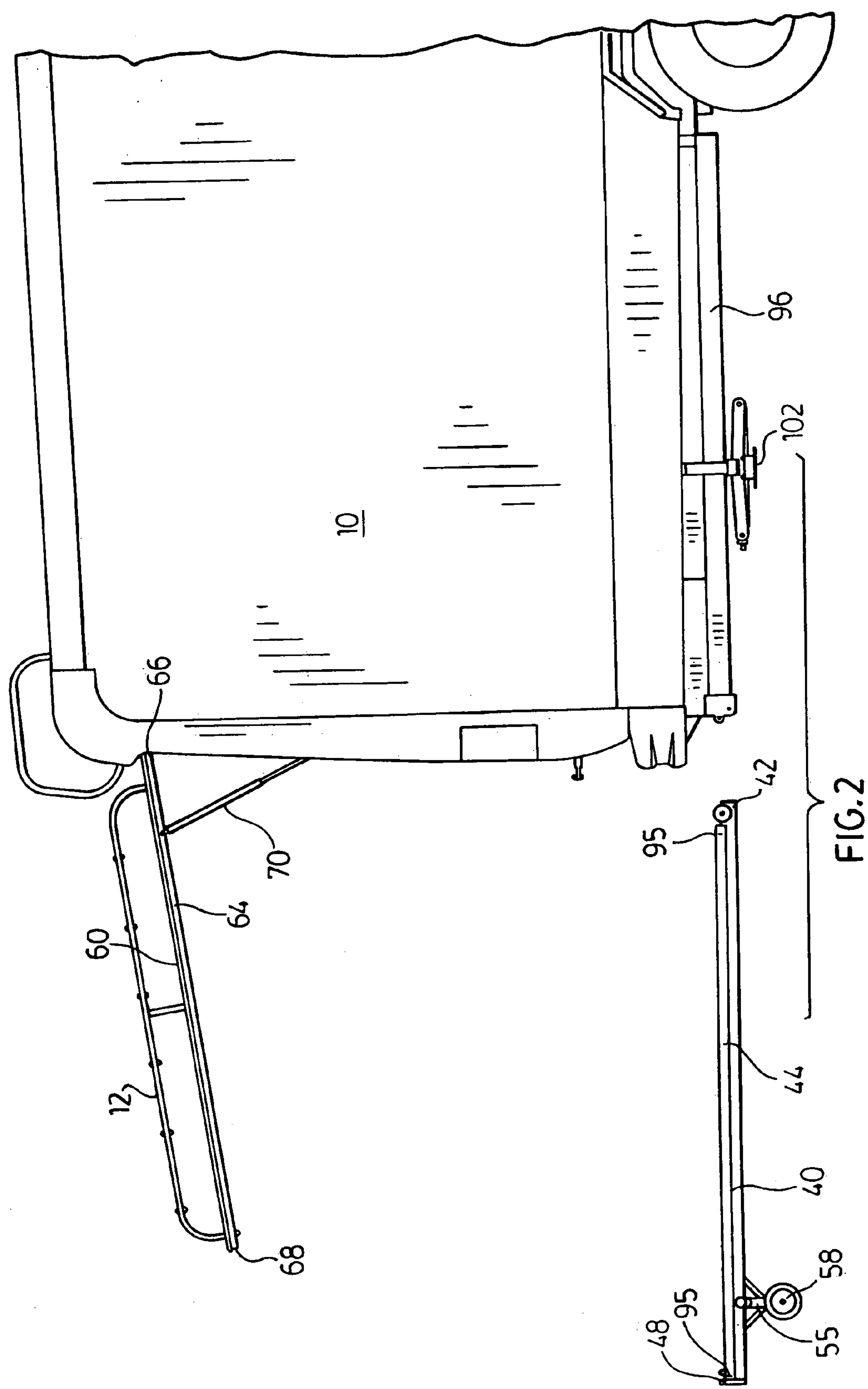
FIG. 2 is an exploded side elevation of the extendable patio room of FIG. 1 without screens.

Turning to FIG. 2, the roof 60 is attached to the trailer 10 by hinge means (not shown) disposed along the edge 66 of the roof 60 proximal to the trailer 10; in the preferred embodiment, the roof is supported in the open position by hydraulic struts 70 and support posts 72 (shown in phantom in FIG. 1) pivotably attached near distal edge 68 of the roof 60. When extended, the patio room 20 provides additional living space accessible from the interior of the trailer 10 through a doorway 90 at the rear of the trailer 10.

The roof 60 is preferably a hardtop roof manufactured from laminated fibreglass and sized to completely cover the doorway 90 when the roof 60 is in the collapsed position (not shown). The roof 60 is hinged to the trailer body 10 along the proximal edge 66 by a hinge means such as a piano hinge. The upper surface of the roof 60 may also be provided with a ladder 12, in order to provide access to the roof of the trailer 10 when the roof 60 is in the closed position.

The hydraulic struts 70 are fixed at one end to the rear of the trailer 10 at a position adjacent the doorway 90, and below the hinge means, and at the other end along the side edges 64 of the roof 60, at point along the edge 64 near the proximal edge 66 of the roof 60. The hinge is preferably protected against the elements on the exterior by a rubber or flexible synthetic flap (not shown) covering the exterior of the hinge. Also, when the roof 60 is in the open position, an additional vinyl covering may be applied on the underside of the of the hinge by means of a hook and loop fastener, or another suitable fastener, to further ensure that the patio room 20 is protected from water leakage.

When the roof 60 is in the closed position, it may be latched in place on the wall of the trailer 10. Preferably, spacers are provided on the exterior of the trailer 10 near the doorway 90, or alternatively on the interior surface of the roof 60, to prevent damage to the roof 60 or trailer 10 when the roof 60 is in the collapsed position.

Turning again to FIG. 1, in the preferred embodiment, an upper screen 80 of flexible material, such as canvas, is suspended from the side edges 64 and the distal edge 68 of the roof 60. When not in use, the upper screen 80 may be stowed against the interior of the roof 60 by means of hook and loop fasteners, wherein one part of the hook and loop fastener is attached near the lower edge of the upper screen 80, and the other part of the fastener is attached to the interior of the roof 60. Separate screens 82, 84, preferably manufactured of mesh fabric, are removably attached to the upper screen 80 by separating zippers or other fastening means. Preferably, any transparent or mesh portions of the upper screen 80 or separate screens 82, 84 may be provided with an optional privacy drape that functions as a curtain. The lower edges of the screens 82, 84 are further removably attached to the patio floor 40 by hook and loop fasteners or other means.

The support posts 72 are pivotably mounted on or near the distal edge 68 of the roof 60, and reciprocate between a stowed position in which the posts 72 are disposed against the roof 60, and are preferably held in place by clasps or other means, and an extended position in which ends of the posts 72 opposite the pivot mounting are fixed in place along the distal edge 48 of the patio floor 40 by locking pin means (not shown).

Figure 3:
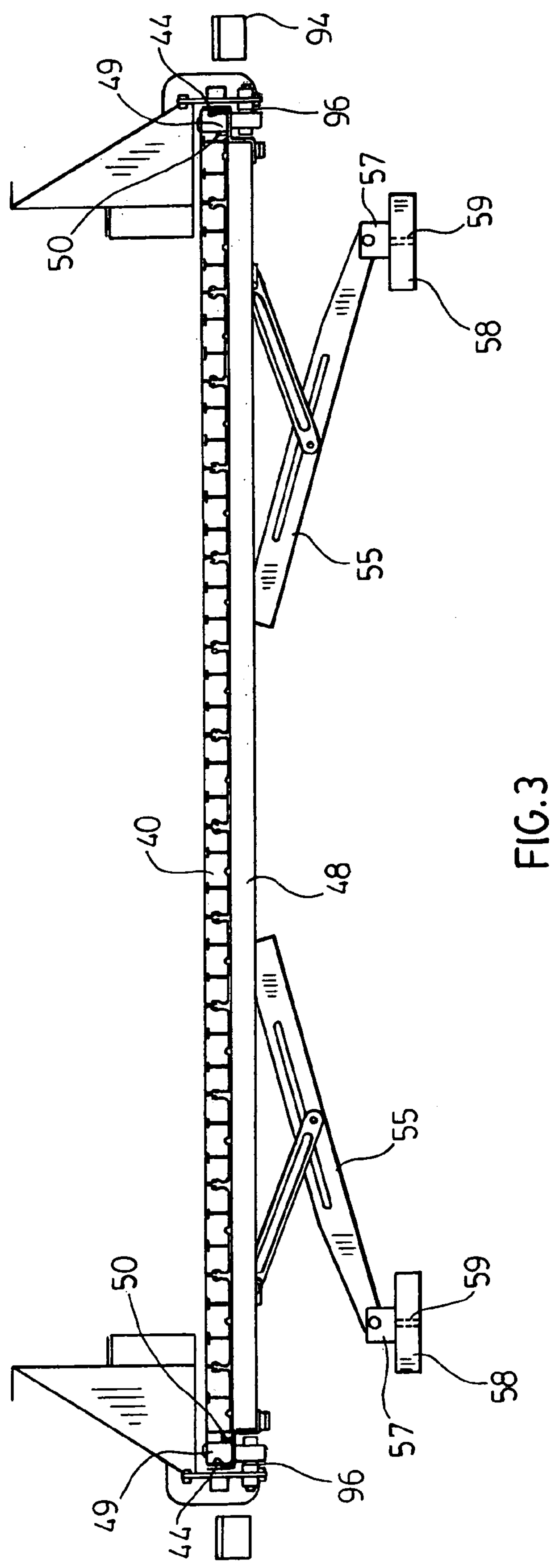
FIG. 3 is a rear sectional view of the channel and patio floor edge of FIG. 1.

Referring to FIG. 3, the patio floor 40 is preferably manufactured using PVC decking board over a frame of galvanized aluminum steel. The side edges 44 of the floor 40 are angled to ride within a channel provided on the underside of the chassis of the trailer 10.

Near the distal edge of the floor 48 are provided stabilizer legs 55 which are pivotably mounted to the underside of the floor 40, as shown in FIGS. 2 and 3; preferably, wheels 58 are mounted on wheel brackets 57 which in turn are rotatably mounted on the stabilizer legs 55 to facilitate extension and retraction of the floor 40. When the floor 40 is in the fully extended or retracted position, the wheel brackets 57 may be rotated until the wheel axles 59 (shown in phantom) are substantially perpendicular to the floor 40, and the brackets 57 then locked in place. In a most preferred embodiment, to further facilitate extension of the floor 40, handles may be provided on or near the distal edge 48 of the floor 40. A further assist leg (not shown) similar to the stabilizer legs 55 may be pivotably mounted to the underside of the floor 40 in a central position.

In either side edge of the floor 40, near the distal and proximal edges 48, 42 of the floor 40, apertures to receive the locking pins are provided for locking the floor 40 in place in either the fully retracted or fully extended position.

On the underside of the chassis of the trailer 10, a pair of rails or channels 96 preferably formed in steel are provided to receive the side edges 44 of the floor 40. Apertures are provide in the rails 96 through which a locking pin 94 may be passed and received by corresponding apertures 95 in the side edges 44 of the floor 40 in order to lock the floor into place. Preferably, stabilizer jacks 102 are pivotably mounted on or near the rails 96 to provide additional support to the trailer 10 when it is parked and in use. Also mounted along the angular side edges 44 of the patio floor 40, near the proximal edge 42, are wheels 49 adapted to run along the rails 96. For further stability while the floor 40 is being retracted or extended, the axle 50 of wheel 49 passes through a slot in the rail 96 and is spaced from the wall of the channel 96 by a washer and nut assembly, thus ensuring that the floor 40 moves along a path substantially parallel to the channels 96.

In the closed position of the patio room 20, the roof 60 lies against the rear of the trailer 10, blocking access to the doorway 90, and is held in place by latches. The floor 40 is held in place along its side edges 44 in the rails 96, and preferably for transporting the trailer 10 to another location, the locking pins 94 are disposed through the apertures in the channels 96, and in the apertures 95 on either side of the floor 40.

To erect the patio room 20, the roof latches are released and the roof 60 is lifted or pushed towards the open position with the assistance of the hydraulic struts 70 by pivoting the hinge. The locking pins 94 are released from the apertures 95, then the stabilizing legs 55 are partially lowered and if provided, the wheels 58 mounted on the brackets 57 are rotated to a working position before fully lowering the stabilizing legs 55 into a position supporting the floor 40. The floor 40 is then extended.

When the floor 40 is completely extended, the wheel brackets 57 on the stabilizing legs 55 are rotated so that the wheels 58 lie substantially flat on the ground, and the locking pins 94 are reinserted through the apertures 95 on either side of the channels 96 to be received by the apertures 95 nearest the proximal end 42 of the floor 40. The height of the stabilizing legs 55 may be adjusted to level the surface of the floor 40.

The upper screen 80 is released from the roof 60. The support posts 72 are released from their stowed position against the roof 60, extended and fixed in place by locking pin means near the distal edge 48 of the patio floor 40, thus supporting the roof 60 in the open position. Screens 82, 84 may be attached to the lower edge of the upper screen 80, and then fastened to the edges 44, 48 of the patio floor 40 by hook and loop fasteners or other means. Preferably, a vinyl flap is removably attached to the inside of the hinge using a hook and loop fastener to ensure watertightness along the hinge. The patio room 20 is thus extended and is available for use, with access through the doorway 90.

To collapse the patio room 20, the screens 82, 84 are detached from the patio floor 40 and the upper screen 80; the vinyl flap, if installed, is detached from the underside of the hinge, and these parts are stowed. The support posts 72 are released from the floor 40, and pivoted back to their stowed position and latched in place against the roof 60. The upper screen 80 is folded against the interior of the roof 60 and fastened into place using the hook and loop fasteners. The roof 60 is then collapsed and latched into place against the trailer 10. The floor locking pins 94 are released from the apertures 95, the channel 96 and the floor 40; the wheel brackets 57 are rotated so that the wheels 58 are in a working position, and the floor 40 is pushed back along the rails 96 until it is fully retracted. The wheel brackets 57 are rotated back to a non-working position so that the wheel is parallel to the floor 40, and the stabilizer legs 55 are then pivoted back to the stowed position against the underside of the floor 40. The locking pins 94 are then replaced through the apertures 95 through the channel 96, thus securing the floor 40 underneath the chassis of the trailer 10. The patio room 20 is thus stowed, and the trailer 10 may be relocated.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. An exterior room for a recreational vehicle trailer comprising:

a floor, extensible between a stowed position and an open position, wherein the floor is supported above ground level by the trailer by at least one rail disposed on an underside of the trailer, wherein at least one edge of the floor is carried within the at least one rail, and by at least one stabilizer leg movable between at least one working position and a non-working position;

a roof, extensible between a stowed position and an open position; and at least one flexible wall extending between the floor and the roof, when the floor and the roof are both in their open position;

wherein the exterior room is accessible through an exit from the interior of the trailer.

2. The exterior room of claim 1 wherein the at least one stabilizer leg comprises:

a leg portion movable between a raised and at least one lowered position, and a wheel mounted on a bracket, the bracket being movable between a working position and a non-working position, wherein in the working position, the wheel is substantially perpendicular to ground level, and in the non-working position, the wheel is substantially parallel to ground level;

such that when the stabilizer is in the non-working position, the bracket is in the non-working position and the leg portion is in the raised position, such that the wheel is not in contact with ground level; and when the stabilizer leg is in a first working position, the bracket is in the working position and the leg portion is in a lowered position, such that the wheel is in contact with ground level.

3. The exterior room of claim 2, wherein when the stabilizer leg is in a second working position, the bracket is in the non-working position and the leg portion in is a lowered position, such that the stabilizer leg supports the floor above ground level.

4. The exterior room of claim 3 wherein the roof is supported in the open position by at least one support post disposed between the roof and the floor.

* * * * *